United States Patent
Luo (10) Patent No.: US 10,437,849 B2
(45) Date of Patent: Oct. 8, 2019

(54) METHOD AND APPARATUS FOR IMPLEMENTING STORAGE OF FILE IN IP DISK

(71) Applicant: Huawei Technologies Co., Ltd., Shenzhen (CN)

(72) Inventor: Qingchao Luo, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 15/299,134

(22) Filed: Oct. 20, 2016

(65) Prior Publication Data

US 2017/0039259 A1 Feb. 9, 2017

Related U.S. Application Data

(63) Continuation of application No. PCT/CN2015/080429, filed on May 30, 2015.

(30) Foreign Application Priority Data

Jun. 24, 2014 (CN) .......................... 2014 1 0286909

(51) Int. Cl.
*G06F 16/10* (2019.01)
*G06F 16/25* (2019.01)
(Continued)

(52) U.S. Cl.
CPC ............ *G06F 16/258* (2019.01); *G06F 16/13* (2019.01); *G06F 16/188* (2019.01)

(58) Field of Classification Search
CPC ......... G06F 17/30569; G06F 17/30091; G06F 17/30233; G06F 16/13; G06F 16/188; G06F 16/258
See application file for complete search history.

(56) References Cited

U.S. PATENT DOCUMENTS

| | | | |
|---|---|---|---|
| 9,110,920 B1* | 8/2015 | Amegadzie | G06F 16/183 |
| 2007/0300078 A1* | 12/2007 | Ochi | G06F 21/10 |
| | | | 713/189 |

(Continued)

FOREIGN PATENT DOCUMENTS

| | | |
|---|---|---|
| CN | 102594849 A | 7/2012 |
| CN | 102651024 A | 8/2012 |

(Continued)

OTHER PUBLICATIONS

Foreign Communication From a Counterpart Application, European Application No. 201410286909.8, European Office Action dated Nov. 2, 2016, 4 pages.

(Continued)

*Primary Examiner* — Alford W Kindred
*Assistant Examiner* — Tiffany Thuy Bui
(74) *Attorney, Agent, or Firm* — Conley Rose, P.C.

(57) ABSTRACT

A method and an apparatus for implementing storage of a file in an Internet Protocol (IP) disk, where the method includes receiving an operation request for a target file, converting operation information of the operation request into a key value of the target file, acquiring, according to the key value, an identifier of a target IP disk corresponding to the operation request, and sending, to the target IP disk identified by the identifier, the operation request carrying the key value such that the application stability can be improved.

17 Claims, 4 Drawing Sheets

(51) Int. Cl.
*G06F 16/13* (2019.01)
*G06F 16/188* (2019.01)

(56) References Cited

U.S. PATENT DOCUMENTS

| | | | |
|---|---|---|---|
| 2011/0167149 A1 | 7/2011 | Lee et al. | |
| 2013/0007008 A1* | 1/2013 | Yuan | G06F 17/30091 707/747 |
| 2013/0103729 A1 | 4/2013 | Cooney et al. | |
| 2013/0111187 A1 | 5/2013 | Liu et al. | |

FOREIGN PATENT DOCUMENTS

| | | | |
|---|---|---|---|
| CN | 102725755 A | 10/2012 | |
| CN | 103327052 A | 9/2013 | |
| CN | 102918509 B | 6/2014 | |
| CN | 104077374 A | 10/2014 | |
| WO | 2012024800 A1 | 3/2012 | |
| WO | WO-2015200503 A1 * | 12/2015 | G06F 17/3033 |
| WO | WO-2016165622 A1 * | 10/2016 | G06F 17/30094 |

OTHER PUBLICATIONS

Wang, D., "Router Configuration and Management Manual—Cisco," Huazhong University of Science and Technology Press, Jan. 2011, 4 pages.

English Translation dated Nov. 6, 2017 of Wang, D., "Router Configuration and Management Manual—Cisco," Huazhong University of Science and Technology Press, Jan. 2011, 6 pages.

Foreign Communication From a Counterpart Application, Chinese Application No. 201410286909.8, Chinese Office Action dated Nov. 16, 2017, 6 pages.

Machine Translation and Abstract of Chinese Publication No. 102725755A, Oct. 10, 2012, 13 pages.

Foreign Communication From a Counterpart Application, Chinese Application No. 201410286909.8, Chinese Office Action dated Jun. 19, 2017, 7 pages.

Machine Translation and Abstract of Chinese Publication No. CN103327052, dated Sep. 25, 2013, 7 pages.

Machine Translation and Abstract of Chinese Publication No. CN104077374, dated Oct. 1, 2014, 2 pages.

Medhi, D., et al., "Network Routing, Algorithms, Protocols, and Architectures," XP055351599, Elsevier, 2007, 30 pages.

Volos, H., et al., "Aerie: Flexible File-System Interfaces to Storage-Class Memory," XP058048177, Eurosys, Apr. 13-16, 2014, 14 pages.

Foreign Communication From a Counterpart Application, European Application No. 15811675.6, Extended European Search Report dated Mar. 14, 2017, 10 pages.

Foreign Communication From a Counterpart Application, Chinese Application No. 201410286909.8, Chinese Office Action dated Nov. 2, 2016, 4 pages.

Foreign Communication From a Counterpart Application, PCT Application No. 2014102869098, Chinese Search Report dated Oct. 21, 2016, 2 pages.

Foreign Communication From a Counterpart Application, PCT Application No. PCT/CN2015/080429, English Translation of International Search Report dated Sep. 2, 2015, 2 pages.

Foreign Communication From a Counterpart Application, PCT Application No. PCT/CN2015/080429, English Translation of Written Opinion dated Sep. 2, 2015, 6 pages.

\* cited by examiner

METHOD AND APPARATUS FOR IMPLEMENTING STORAGE OF FILE IN IP DISK

CROSS-REFERENCE TO RELATED APPLICATIONS

This application is a continuation of International Application No. PCT/CN2015/080429, filed on May 30, 2015, which claims priority to Chinese Patent Application No. 201410286909.8, filed on Jun. 24, 2014. The disclosures of the aforementioned applications are hereby incorporated by reference in their entireties.

TECHNICAL FIELD

The present disclosure relates to the field of file system technologies, and in particular, to a method and an apparatus for implementing storage of a file in an Internet Protocol (IP) disk.

BACKGROUND

With continuous development of Internet technologies, to implement sharing of stored files using a network, in a network attached storage (NAS) technology, a storage apparatus is connected to a server using a network. In the NAS technology, a tree structure is used to manage files in a storage apparatus, consequently, with a continuous increase of a quantity and types of files, a complicated spatial organization algorithm is needed to manage files in the storage apparatus. Therefore, to simplify management on files in a storage apparatus, a key-value storage technology is proposed in the industry. In the technology, a server is connected to an IP disk using a network, and files in the IP disk are in a one-to-one correspondence with key values. Therefore, the files in the IP disk can be managed using the key values. In the key-value storage technology, key is used to indicate address information of a file, and value is used to indicate content information of a file.

Because files in an IP disk are managed using key values, to ensure that an application on a server can access a file in the IP disk, the application on the server needs to be modified to generate an operation request including a key value. However, because there are relatively many types of applications and relatively many applications on a server, normal use of the existing applications is affected if each application is modified, thereby reducing application stability.

SUMMARY

Embodiments of the present disclosure disclose a method and an apparatus for implementing storage of a file in an IP disk in order to improve application stability.

A first aspect of the embodiments of the present disclosure discloses a method for implementing storage of a file in an IP disk, including receiving an operation request for a target file, converting operation information of the operation request into a key value of the target file, acquiring, according to the key value, an identifier of a target IP disk corresponding to the operation request, and sending, to the target IP disk identified by the identifier, the operation request carrying the key value.

With reference to the first aspect of the embodiments of the present disclosure, in a first possible implementation manner of the first aspect of the embodiments of the present disclosure, the converting operation information of the operation request into a key value of the target file includes converting the operation information of the operation request into the key value of the target file using a type length value algorithm.

With reference to the first possible implementation manner of the first aspect of the embodiments of the present disclosure, in a second possible implementation manner of the first aspect of the embodiments of the present disclosure, the operation information includes a type of the target file, a path of the target file, a content identifier of the target file, and a content length of the target file.

With reference to the second possible implementation manner of the first aspect of the embodiments of the present disclosure, in a third possible implementation manner of the first aspect of the embodiments of the present disclosure, converting the operation information of the operation request into the key value of the target file using a type length value algorithm includes converting the type of the target file into a first subkey value, converting the path of the target file into a second subkey value, converting the content identifier of the target file into a third subkey value, converting the content length of the target file into a fourth subkey value, and acquiring the key value of the target file, where the key value includes the first subkey value, the second subkey value, the third subkey value, and the fourth subkey value.

A second aspect of the embodiments of the present disclosure discloses an apparatus for implementing storage of a file in an IP disk, where the file storage apparatus is built in a server and includes a receiving unit configured to receive an operation request for a target file, a conversion unit configured to convert operation information of the operation request received by the receiving unit into a key value of the target file, an acquiring unit configured to acquire, according to the key value obtained by conversion performed by the conversion unit, an identifier of a target IP disk corresponding to the operation request, and a sending unit configured to send, to the target IP disk that is identified by the identifier acquired by the acquiring unit, the operation request carrying the key value obtained by conversion performed by the conversion unit.

With reference to the second aspect of the embodiments of the present disclosure, in a first possible implementation manner of the second aspect of the embodiments of the present disclosure, the conversion unit is further configured to convert the operation information of the operation request into the key value of the target file using a type length value algorithm.

With reference to the first possible implementation manner of the second aspect of the embodiments of the present disclosure, in a second possible implementation manner of the second aspect of the embodiments of the present disclosure, the operation information includes a type of the target file, a path of the target file, a content identifier of the target file, and a content length of the target file.

With reference to the second possible implementation manner of the second aspect of the embodiments of the present disclosure, in a third possible implementation manner of the second aspect of the embodiments of the present disclosure, the conversion unit includes a first conversion subunit configured to convert the type of the target file into a first subkey value, a second conversion subunit configured to convert the path of the target file into a second subkey value, a third conversion subunit configured to convert the content identifier of the target file into a third subkey value, a fourth conversion subunit configured to convert the content length of the target file into a fourth subkey value, and an acquiring subunit configured to acquire the key value of the target file, where the key value includes the first subkey value obtained by conversion performed by the first conversion subunit, the second subkey value obtained by conversion performed by the second conversion subunit, the third subkey value obtained by conversion performed by the third conversion subunit, and the fourth subkey value obtained by conversion performed by the fourth conversion subunit.

In the embodiments of the present disclosure, an operation request for a target file is received, operation information of the operation request is converted into a key value of the target file, an identifier of a target IP disk corresponding to the operation request is acquired according to the key value, and the operation request carrying the key value is sent to the target IP disk identified by the identifier. In the embodiments of the present disclosure, operation information of an operation request generated using an existing application is converted into a key value. Further, it can be ensured that an application on a server can access an IP disk, and the existing application does not need to be modified. Therefore, normal use of the existing application is not affected, and consequently, application stability can be improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a method and an apparatus for implementing storage of a file in an IP disk in order to increase a file processing rate. Detailed descriptions are separately provided in the following.

Figure 1:
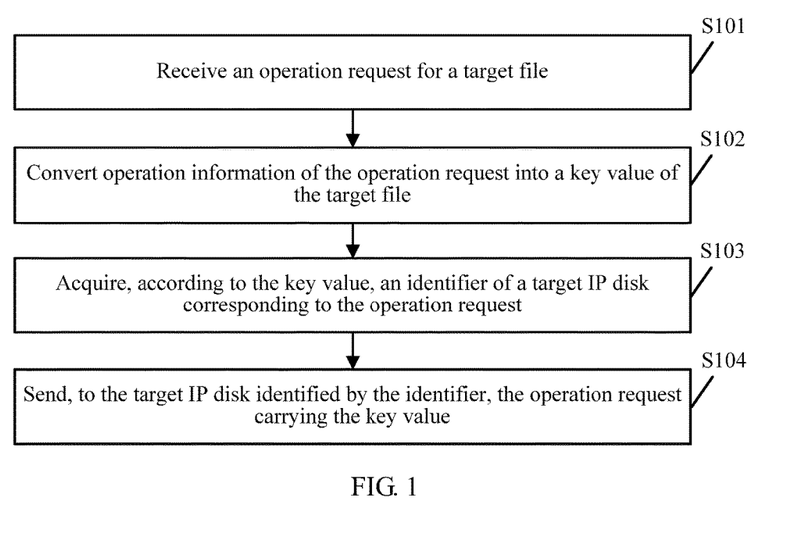
FIG. 1 is a flowchart of a method for implementing storage of a file in an IP disk disclosed in an embodiment of the present disclosure.

Referring to FIG. 1, FIG. 1 is a flowchart of a method for implementing storage of a file in an IP disk disclosed in an embodiment of the present disclosure. The method for implementing storage of a file in an IP disk shown in FIG. 1 is described from a perspective of an apparatus, built in a server, for implementing storage of a file in an IP disk. As shown in FIG. 1, the method for implementing storage of a file in an IP disk may include the following steps.

Step S101: Receive an operation request for a target file.

Figure 2:
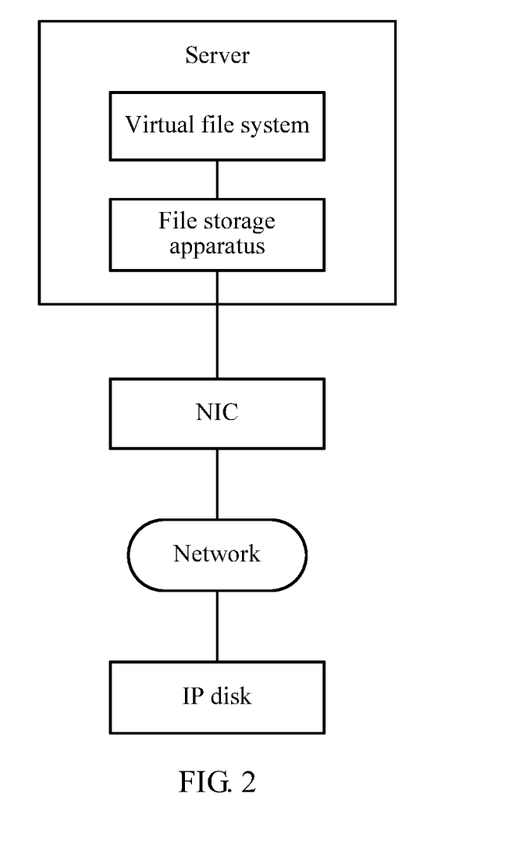
FIG. 2 is a network architectural diagram of a server and an IP disk disclosed in an embodiment of the present disclosure.

In this embodiment, as shown in FIG. 2, when a server accesses a network using a network adapter (for example Network Interface Card (NIC)) and an IP disk is connected to the network, the server may access the IP disk using the network. A file stored in the IP disk is managed using a key value, and an operation request generated by the server using an unmodified (existing) application is incompatible with the key value. Therefore, to ensure that the application on the server can access the IP disk, operation information of the operation request needs to be first converted into the key value before the operation request is sent to the IP disk. In this case, a virtual file system (VFS) in the server sends the operation request generated using the existing application to the apparatus, in the server, for implementing storage of a file in an IP disk such that the apparatus for implementing storage of a file in an IP disk converts the operation information of the operation request into the key value of the file.

In this embodiment, when the application on the server needs to perform an operation of writing the target file into the IP disk, reading the target file from the IP disk, deleting the target file from the IP disk, or the like, the apparatus, in the server, for implementing storage of a file in an IP disk receives the operation request that is for the target file and that is sent by the VFS, where the operation request is an operation request generated using the unmodified application.

Step S102: Convert operation information of the operation request to a key value of the target file.

In this embodiment, because different coding standards are followed when the operation request and the key value are coded, after the operation request for the target file is received, the operation information of the operation request is converted into the key value of the target file, that is, the operation request is re-coded using a same coding standard as that for a key value of the IP disk. The target file has a unique corresponding key value.

Step S103: Acquire, according to the key value, an identifier of a target IP disk corresponding to the operation request.

In this embodiment, because different IP disks have different identifiers, and the key value of the target file includes the identifier of the corresponding target IP disk, the identifier of the target IP disk corresponding to the operation request is acquired using the key value.

Step S104: Send, to the target IP disk identified by the identifier, the operation request carrying the key value.

In this embodiment, the operation request carrying the key value is sent to the target IP disk identified by the identifier in order to trigger the target IP disk to operate the target file using the key value.

In the method for implementing storage of a file in an IP disk described in FIG. 1, an operation request for a target file is received, operation information of the operation request is converted into a key value of the target file, an identifier of a target IP disk corresponding to the operation request is acquired according to the key value, and the operation request carrying the key value is sent to the target IP disk identified by the identifier. In this embodiment of the present disclosure, operation information of an operation request generated using an existing application is converted into a key value. Further, it can be ensured that an application on a server can access an IP disk, and the existing application does not need to be modified. Therefore, normal use of the existing application is not affected, and consequently, application stability can be improved.

Figure 3:
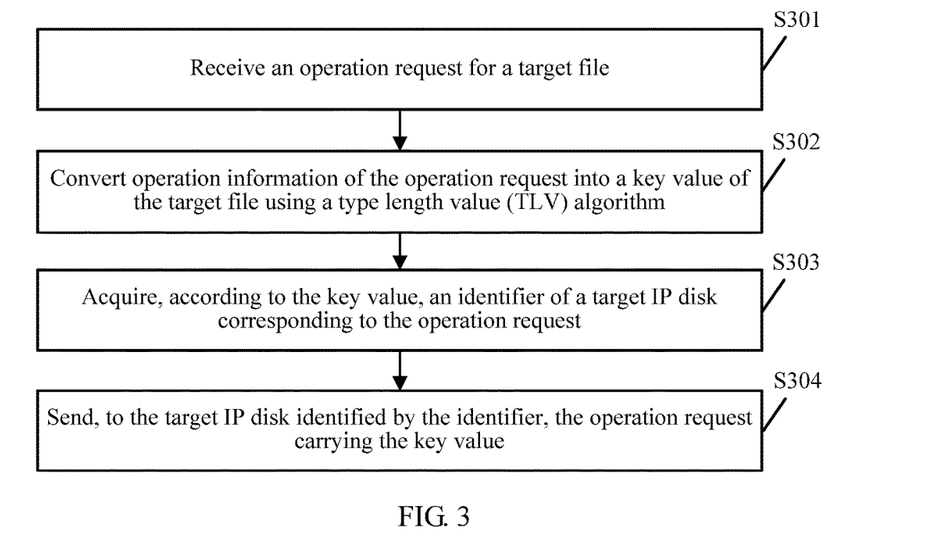
FIG. 3 is a flowchart of another method for implementing storage of a file in an IP disk disclosed in an embodiment of the present disclosure.

Referring to FIG. 3, FIG. 3 is a flowchart of another method for implementing storage of a file in an IP disk disclosed in an embodiment of the present disclosure. The method for implementing storage of a file in an IP disk shown in FIG. 3 is described from a perspective of an apparatus, built in a server, for implementing storage of a file in an IP disk. As shown in FIG. 3, the method for implementing storage of a file in an IP disk may include the following steps.

Step S301: Receive an operation request for a target file.

In this embodiment, as shown in FIG. 2, when the server accesses a network using a NIC and an IP disk is connected to the network, the server can access the IP disk using the network. A file stored in the IP disk is managed using a key value, and an operation request generated by the server using an unmodified (existing) application is incompatible with the key value. Therefore, to ensure that the application on the server can access the IP disk, operation information of the operation request needs to be first converted into the key value before the operation request is sent to the IP disk. In this case, a VFS in the server sends the operation request generated using the existing application to the apparatus, in the server, for implementing storage of a file in an IP disk such that the apparatus for implementing storage of a file in an IP disk converts the operation information of the operation request into the key value of the file.

In this embodiment, when the application on the server needs to perform an operation of writing the target file into the IP disk, reading the target file from the IP disk, deleting the target file from the IP disk, or the like, the apparatus, in the server, for implementing storage of a file in an IP disk receives the operation request that is for the target file and that is sent by the VFS, where the operation request is an operation request generated using the unmodified application.

Step S302: Convert operation information of the operation request into a key value of the target file using a type length value (TLV) algorithm.

In this embodiment, because different coding standards are followed when the operation request and the key value are coded, after the operation request for the target file is received, the operation information of the operation request is converted into the key value of the target file using the TLV algorithm, that is, the operation request is re-coded using a same coding standard as that for a key value of the IP disk. The target file has a unique corresponding key value.

As a possible implementation manner, the operation information includes a type of the target file, a path of the target file, a content identifier of the target file, and a content length of the target file.

In this embodiment, the operation information of the operation request includes a type of the target file, a path of the target file, content identifier of the target file, and a content length of the target file. The type of the target file may be data or metadata, and the path of the target file is a path of the target file in a shared file, where the path in the IP disk is the same as that in each server.

As a possible implementation manner, the converting operation information of the operation request into a key value of the target file using a TLV algorithm may include the following steps.

Step A: Convert the type of the target file to a first subkey value.

Step B: Convert the path of the target file to a second subkey value.

Step C: Convert the content identifier of the target file to a third subkey value.

Step D: Convert the content length of the target file to a fourth subkey value.

Step E: Acquire the key value of the target file, where the key value includes the first subkey value, the second subkey value, the third subkey value, and the fourth subkey value.

In this embodiment, the first subkey value, the second subkey value, the third subkey value, and the fourth subkey value form the key value of the target file, and a sequence of the first subkey value, the second subkey value, the third subkey value, and the fourth subkey value is the first subkey value to the fourth subkey value, where the first subkey value indicates the type of the target file, the second subkey value indicates the path (namely, address) of the target file, the third subkey value indicates content identifier of the target file, and the fourth subkey value indicates operating the content length of the target file.

For example, it is assumed that operation information of an operation request is reading an offset of 1 megabyte (MB) (0x00100000) at F:1:5_/root:4_OFFSET:4_LENGTH, where a content length of a target file is 1 MB, F represents a type of the operation request, 1 represents a type of the operation request, 5_/root represents a path of the target file, 4_OFFSET represents a content identifier of the target file, and 4_LENGTH represents the content length of the target file. An operation of converting operation information of the operation request into a key value of the target file using a TLV algorithm includes allocating key value space of a specific byte to the operation information of the operation request, performing initialization, and converting the type 1 of the target file into 0x01 using American Standard Code for Information Interchange (ASCII), where 0x indicates hexadecimal notation, converting the path 5_/root of the target file into 0x05 5F 2F 72 6F 6F 74, converting the content identifier 4_OFFSET of the target file into 04 5F 00100000, where 00100000 indicates reading the offset of 1 MB, converting the content length 4_LENGTH of the target file into 04 5F 00100000, where 00100000 identifies that the content length of the target file is 1 MB, and obtaining the key value of the target file: 0X01 3A 05 5F 2F 72 6F 6F 74 3A 04 5F 00100000 3A 04 5F 00100000. The type of the operation request does not need to be converted into a key value.

In this embodiment, when the operation information of the operation request is to be converted into the key value, there are two conversion manners. One is to first convert the operation information of the operation request to a character string and then convert the character string into hexadecimal notation. The other is to directly convert the operation information of the operation request into hexadecimal notation. The second conversion manner is used in the TLV algorithm. Therefore, the TLV algorithm can increase a conversion rate compared with the first conversion manner. In addition, because each byte in the character string may represent a maximum of 9, each byte in hexadecimal notation may represent a maximum of 15, and in the TLV algorithm, the key value is coded using hexadecimal notation, a byte length occupied by the key value is the shortest. Therefore, a file processing rate is increased, and key value storage space is reduced.

Step S303: Acquire, according to the key value, an identifier of a target IP disk corresponding to the operation request.

In this embodiment, because different IP disks have respective identifiers, and the key value of the target file includes the identifier of the corresponding target IP disk, the identifier of the target IP disk corresponding to the operation request is acquired using the key value.

Step S304: Send, to the target IP disk identified by the identifier, the operation request carrying the key value.

In this embodiment, the operation request carrying the key value is sent to the target IP disk identified by the identifier in order to trigger the target IP disk to operate the target file using the key value.

In the method for implementing storage of a file in an IP disk described in FIG. 3, an operation request for a target file is received, operation information of the operation request is converted into a key value of the target file using a TLV algorithm, an identifier of a target IP disk corresponding to the operation request is acquired according to the key value, and the operation request carrying the key value is sent to the target IP disk identified by the identifier. In this embodiment of the present disclosure, operation information of an operation request generated using an existing application is converted into a key value. Further, it can be ensured that an application on a server can access an IP disk, and the existing application does not need to be modified. Therefore, normal use of the existing application is not affected, and consequently, application stability can be improved.

Figure 4:
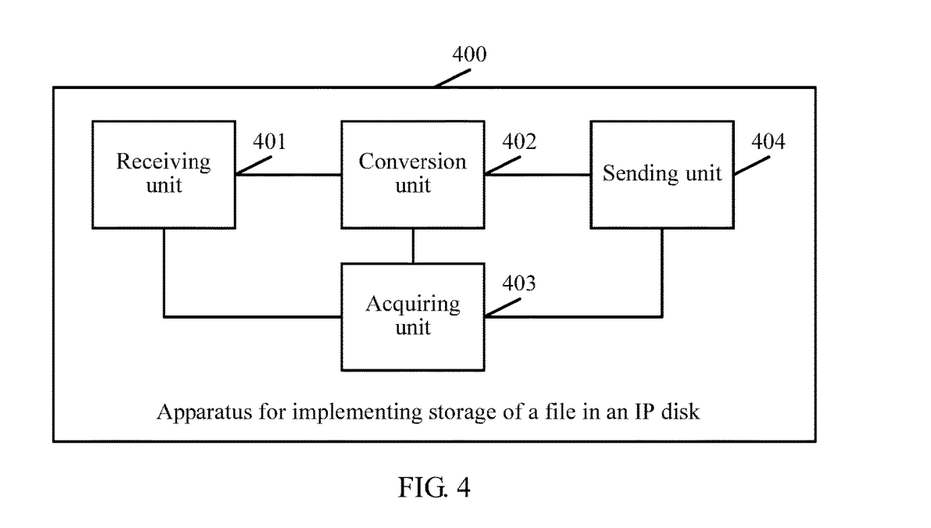
FIG. 4 is a structural diagram of an apparatus for implementing storage of a file in an IP disk disclosed in an embodiment of the present disclosure.

Referring to FIG. 4, FIG. 4 is a structural diagram of an apparatus for implementing storage of a file in an IP disk disclosed in an embodiment of the present disclosure. The apparatus for implementing storage of a file in an IP disk is built in a server. As shown in FIG. 4, the apparatus 400 for implementing storage of a file in an IP disk may include a receiving unit 401 configured to receive an operation request for a target file, a conversion unit 402 configured to convert operation information of the operation request received by the receiving unit 401 into a key value of the target file, an acquiring unit 403 configured to acquire, according to the key value obtained by conversion performed by the conversion unit 402, an identifier of a target IP disk that corresponds to the operation request received by the receiving unit 401, and a sending unit 404 configured to send, to the target IP disk that is identified by the identifier acquired by the acquiring unit 403, the operation request carrying the key value obtained by conversion performed by the conversion unit 402.

In this embodiment, as shown in FIG. 2, when the server accesses a network using a NIC and an IP disk is connected to the network, the server can access the IP disk using the network. A file stored in the IP disk is managed using a key value, and an operation request generated by the server using an unmodified (existing) application is incompatible with the key value. Therefore, to ensure that the application on the server can access the IP disk, operation information of the operation request needs to be first converted into the key value before the operation request is sent to the IP disk. In this case, a VFS in the server sends the operation request generated using the existing application to the apparatus, in the server, for implementing storage of a file in an IP disk such that the apparatus for implementing storage of a file in an IP disk converts the operation information of the operation request into the key value of the file.

In this embodiment, when the application on the server needs to perform an operation of writing the target file into the IP disk, reading the target file from the IP disk, deleting the target file from the IP disk, or the like, the receiving unit 401 receives the operation request that is for the target file and that is sent by the VFS, where the operation request is an operation request generated using the unmodified application.

As a possible implementation manner, the conversion unit 402 is further configured to convert the operation information of the operation request into the key value of the target file using a TLV algorithm.

In this embodiment, because different coding standards are followed when the operation request and the key value are coded, after the receiving unit 401 receives the operation request for the target file, the conversion unit 402 converts the operation information of the operation request into the key value of the target file using the TLV algorithm, that is, re-coding the operation request using a same coding standard as that for a key value of the IP disk. The target file has a unique corresponding key value.

As a possible implementation manner, the operation information includes a type of the target file, a path of the target file, a content identifier of the target file, and a content length of the target file.

In this embodiment, the operation information of the operation request includes a type of the target file, a path of the target file, content identifier of the target file, and a content length of the target file. The type of the target file may be data or metadata, and the path of the target file is a path of the target file in a shared file, where the path in the IP disk is the same as that in each server.

As a possible implementation manner, the conversion unit 402 includes a first conversion subunit configured to convert the type of the target file into a first subkey value, a second conversion subunit configured to convert the path of the target file into a second subkey value, a third conversion subunit configured to convert the content identifier of the target file into a third subkey value, a fourth conversion subunit configured to convert the content length of the target file into a fourth subkey value, and an acquiring subunit configured to acquire the key value of the target file, where the key value includes the first subkey value obtained by conversion performed by the first conversion subunit, the second subkey value obtained by conversion performed by the second conversion subunit, the third subkey value obtained by conversion performed by the third conversion subunit, and the fourth subkey value obtained by conversion performed by the fourth conversion subunit.

In this embodiment, the first subkey value, the second subkey value, the third subkey value, and the fourth subkey value form the key value of the target file, and a sequence of the first subkey value, the second subkey value, the third subkey value, and the fourth subkey value is the first subkey value to the fourth subkey value, where the first subkey value indicates the type of the target file, the second subkey value indicates the path (namely, address) of the target file, the third subkey value indicates content identifier of the target file, and the fourth subkey value indicates operating the content length of the target file.

For example, it is assumed that operation information of an operation request includes reading an offset of 1 MB (0x00100000) at F:1:5_/root:4_OFFSET:4_LENGTH, where a content length of a target file is 1 MB, F represents a type of the operation request, 1 is a type of the operation request, 5_/root is a path of the target file, 4_OFFSET is a content identifier of the target file, and 4_LENGTH is the content length of the target file. An operation of converting operation information of the operation request into a key value of the target file using a TLV algorithm includes allocating key value space of a specific byte to the operation information of the operation request, performing initialization, and converting the type 1 of the target file into 0x01 using ASCII, where 0x indicates hexadecimal notation, converting the path 5_/root of the target file into 0x05 5F 2F 72 6F 6F 74, converting the content identifier 4_OFFSET of the target file into 04 5F 00100000, where 00100000 indicates reading the offset of 1 MB, converting the content length 4_LENGTH of the target file into 04 5F 00100000, where 00100000 identifies that the content length of the target file is 1 MB, and obtaining the key value of the target file: 0X01 3A 05 5F 2F 72 6F 6F 74 3A 04 5F 00100000 3A 04 5F 00100000. The type of the operation request does not need to be converted into a key value.

In this embodiment, there are two conversion manners when the operation information of the operation request is to be converted into the key value. One is to first convert the operation information of the operation request into a character string and then convert the character string into hexadecimal notation. The other is to directly convert the operation information of the operation request into hexadecimal notation. The second conversion manner is used in the TLV algorithm. Therefore, the TLV algorithm can increase a conversion rate compared with the first conversion manner. In addition, because each byte in the character string may represent a maximum of 9, each byte in hexadecimal notation may represent a maximum of 15, and in the TLV algorithm, the key value is coded using hexadecimal notation, a byte length occupied by the key value is the shortest. Therefore, a file processing rate is increased, and key value storage space is reduced.

According to the apparatus for implementing storage of a file in an IP disk described in FIG. 4, an operation request for a target file is received, operation information of the operation request is converted into a key value of the target file using a TLV algorithm, an identifier of a target IP disk corresponding to the operation request is acquired according to the key value, and the operation request carrying the key value is sent to the target IP disk identified by the identifier. In this embodiment of the present disclosure, operation information of an operation request generated using an existing application is converted into a key value. Further, it can be ensured that an application on a server can access an IP disk, and the existing application does not need to be modified. Therefore, normal use of the existing application is not affected, and consequently, application stability can be improved.

Figure 5:
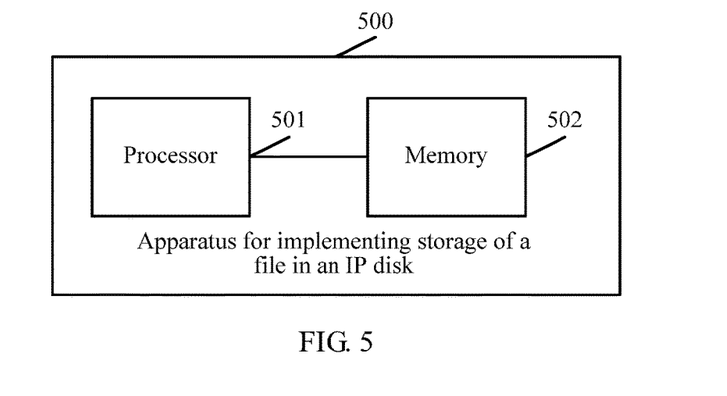
FIG. 5 is a structural diagram of another apparatus for implementing storage of a file in an IP disk disclosed in an embodiment of the present disclosure.

Referring to FIG. 5, FIG. 5 is a structural diagram of another apparatus for implementing storage of a file in an IP disk disclosed in an embodiment of the present disclosure. The apparatus for implementing storage of a file in an IP disk is built in a server. As shown in FIG. 5, the apparatus 500 for implementing storage of a file in an IP disk may include a processor 501 and a memory 502, where the memory 502 stores a set of program code, and the processor 501 is configured to invoke the program code stored in the memory 502, to execute the operations of receiving an operation request for a target file, converting operation information of the operation request into a key value of the target file, acquiring, according to the key value, an identifier of a target IP disk corresponding to the operation request, and sending, to the target IP disk identified by the identifier, the operation request carrying the key value.

As a possible implementation manner, a manner of converting the operation information of the operation request into the key value of the target file by the processor 501 includes converting the operation information of the operation request into the key value of the target file using a TLV algorithm.

As a possible implementation manner, the operation information includes a type of the target file, a path of the target file, a content identifier of the target file, and a content length of the target file.

As a possible implementation manner, a manner of converting, by the processor 501, the operation information of the operation request into the key value of the target file using the TLV algorithm includes converting the type of the target file into a first subkey value, converting the path of the target file into a second subkey value, converting the content identifier of the target file into a third subkey value, converting the content length of the target file into a fourth subkey value, and acquiring the key value of the target file, where the key value includes the first subkey value, the second subkey value, the third subkey value, and the fourth subkey value.

According to the apparatus for implementing storage of a file in an IP disk described in FIG. 5, an operation request for a target file is received, operation information of the operation request is converted into a key value of the target file using a TLV algorithm, an identifier of a target IP disk corresponding to the operation request is acquired according to the key value, and the operation request carrying the key value is sent to the target IP disk identified by the identifier in order to trigger the IP disk to operate the target file using the key value. In this embodiment of the present disclosure, operation information of an operation request generated using an existing application is converted into a key value. Further, it can be ensured that an application on a server can access an IP disk, and the existing application does not need to be modified. Therefore, normal use of the existing application is not affected, and consequently, application stability can be improved.

In an embodiment, the present disclosure further disclose a computer storage medium, where the computer storage medium stores a computer program. The computer is enabled to complete all steps of the method for implementing storage of a file in an IP disk disclosed by the embodiments of the present disclosure when the computer program in the computer storage medium is read into the computer.

A person of ordinary skill in the art may understand that all or some of the steps of the methods in the embodiments may be implemented by a program instructing relevant hardware. The program may be stored in a computer-readable storage medium. The storage medium may include a flash memory, a read-only memory (ROM), a random access memory (RAM), a magnetic disk, an optical disc, or the like.

The foregoing provides detailed descriptions of the method and apparatus for implementing storage of a file in an IP disk that are provided by the embodiments of the present disclosure. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A method performed by a server, comprising:
receiving, by a receiver of the server, a first operation request comprising operation information for accessing a target file stored in an Internet Protocol (IP) disk, wherein the IP disk is coupled to the server via a network;
converting, by a processor coupled to the receiver, the operation information of the first operation request into a plurality of sub-key values describing the target file based on a coding standard of a key value of the target file by:
converting a type of the target file into a first subkey value;
converting a path of the target file into a second subkey value;
converting a content identifier of the target file into a third subkey value;
converting a content length of the target file into a fourth subkey value; and
acquiring the key value of the target file, wherein the key value comprises the first subkey value, the second subkey value, the third subkey value, and the fourth subkey value, wherein the key value comprises the plurality of sub-key values and an identifier of the IP disk corresponding to the first operation request;
acquiring, by the processor, the identifier of the IP disk corresponding to the first operation request from the key value; and
sending, by a transmitter coupled to the processor, a second operation request comprising the key value to the IP disk identified by the identifier to permit the IP disk to access the target file based on the key value.

2. The method of claim 1, wherein the operation information of the first operation request is converted into the key value of the target file by re-coding the operation information using the coding standard the key value of the target file.

3. The method of claim 2, wherein the operation information comprises the type of the target file, the path of the target file, the content identifier of the target file, and the content length of the target file.

4. The method of claim 1, wherein a coding standard of the first operation request is incompatible with the coding standard key value of the target file.

5. The method of claim 1, wherein converting the operation information of the first operation request into the key value of the target file comprises:
converting, by the processor, the operation information of the first operation request into a character string; and
converting, by the processor, the character string into a hexadecimal notation representing the key value of the target file.

6. The method of claim 1, wherein converting the operation information of the first operation request into the key value of the target file comprises directly converting the operation information of the first operation request into a hexadecimal notation representing the key value of the target file.

7. An apparatus, comprising:
a receiver configured to receive a first operation request comprising operation information for accessing a target file stored in an Internet Protocol (IP) disk, wherein the IP disk is coupled to the apparatus via a network;
a processor coupled to the receiver and configured to:
convert the operation information of the first operation request into a plurality of sub-key values describing the target file based on a coding standard of a key value of the target file by:
converting a type of the target file into a first subkey value;
converting a path of the target file into a second subkey value;
converting a content identifier of the target file into a third subkey value;
converting a content length of the target file into a fourth subkey value; and
acquiring the key value of the target file, wherein the key value comprises the first subkey value, the second subkey value, the third subkey value, and the fourth subkey value, wherein the key value comprises the plurality of sub-key values and an identifier of the IP disk corresponding to the first operation request;
acquire the identifier of the IP disk corresponding to the first operation request from the key value; and
a transmitter coupled to the processor and configured to send a second operation request comprising the key value to the target IP disk identified by the identifier to permit the IP disk to access the target file based on the key value.

8. The apparatus of claim 7, wherein the operation information of the first operation request is converted into the key value of the target file by re-coding the operation information using the coding standard the key value of the target file.

9. The apparatus of claim 8, wherein the operation information comprises the type of the target file, the path of the target file, the content identifier of the target file, and the content length of the target file.

10. The apparatus of claim 7, wherein a coding standard of the first operation request is incompatible with the coding standard key value of the target file.

11. The apparatus of claim 7, wherein the processor is further configured to:
convert the operation information of the first operation request into a character string; and
convert the character string into a hexadecimal notation representing the key value of the target file.

12. The apparatus of claim 7, wherein the processor is further configured to directly convert the operation information of the first operation request into a hexadecimal notation representing the key value of the target file.

13. A non-transitory computer readable storage medium comprising instructions that when executed by a processor, cause the processor to:
receive a first operation request comprising operation information for accessing a target file stored in an Internet Protocol (IP) disk, wherein the IP disk is coupled to the processor via a network;
convert the operation information of the first operation request into a plurality of sub-key values describing the target file based on a coding standard of a key value of the target file by:
converting a type of the target file into a first subkey value;
converting a path of the target file into a second subkey value;
converting a content identifier of the target file into a third subkey value;
converting a content length of the target file into a fourth subkey value; and
acquiring the key value of the target file, wherein the key value comprises the first subkey value, the second subkey value, the third subkey value, and the fourth subkey value, wherein the key value comprises the plurality of sub-key values and an identifier of the IP disk corresponding to the first operation request;

acquire the identifier of the IP disk corresponding to the first operation request from the key value; and send a second operation request comprising the key value to the IP disk identified by the identifier to permit the IP disk to access the target file based on the key value.

14. The non-transitory computer readable storage medium of claim 13, wherein the operation information of the first operation request is converted into the key value of the target file by re-coding the operation information using the coding standard the key value of the target file.

15. The non-transitory computer readable storage medium of claim 14, wherein the operation information comprises the type of the target file, the path of the target file, the content identifier of the target file, and the content length of the target file.

16. The non-transitory computer readable storage medium of claim 13, wherein a coding standard of the first operation request is incompatible with the coding standard key value of the target file.

17. The non-transitory computer readable storage medium of claim 13, wherein the instructions that when executed by the processor, further cause the processor to convert the operation information of the first operation request into a hexadecimal notation representing the key value of the target file.

* * * * *